(12) United States Patent
Nitta

(10) Patent No.: US 7,279,810 B2
(45) Date of Patent: Oct. 9, 2007

(54) STORAGE SYSTEM AND CONTROLLING METHOD THEREFOR

(75) Inventor: Toshihiro Nitta, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 336 days.

(21) Appl. No.: 11/165,290

(22) Filed: Jun. 24, 2005

(65) Prior Publication Data
US 2006/0238032 A1 Oct. 26, 2006

(30) Foreign Application Priority Data
Apr. 26, 2005 (JP) ............... 2005-127871

(51) Int. Cl.
*H02J 7/00* (2006.01)
*G06F 11/00* (2006.01)
*G06F 1/00* (2006.01)

(52) U.S. Cl. ............... 307/64; 714/14; 714/22; 714/24; 713/324

(58) Field of Classification Search ............ 307/64; 714/14, 22, 24; 713/324
See application file for complete search history.

(56) References Cited

U.S. PATENT DOCUMENTS 7,036,033 B1 * 4/2006 Price ............... 713/340
7,051,233 B2 * 5/2006 Fukumori et al. ........ 714/14
7,152,175 B2 * 12/2006 Madany et al. ........ 713/340
2006/0190747 A1 * 8/2006 Fukumori ............ 713/300

FOREIGN PATENT DOCUMENTS

JP 5-030073 2/1993

* cited by examiner

*Primary Examiner*—Michael Sherry
*Assistant Examiner*—Michael Rutland-Wallis
(74) *Attorney, Agent, or Firm*—Mattingly, Stanger, Malur & Brundidge, P.C.

(57) ABSTRACT

With a storage system including a drive and a controller, which are connected to each other via cables, and with a method for controlling the storage system, an emergency power supply voltage for a power failure at the drive is multiplexed at the controller with a first signal to be sent to the drive, and the resultant emergency power supply voltage is sent via the cable to the drive. When a power failure occurs at the drive, the drive is powered with the emergency power supply voltage sent from the controller, and specified power failure information is multiplexed at the drive with a second signal to be sent to the controller, and the resultant power failure information is then sent via the cable to the controller; and specified processing is executed at the controller in response to the power failure information sent from the drive via the cable. Accordingly, it is possible to realize a storage system and the controlling method therefor that are adequate for practical applications and can sufficiently cope with drive power failures without the need for complication and upsizing of the entire system configuration.

14 Claims, 11 Drawing Sheets

STORAGE SYSTEM AND CONTROLLING METHOD THEREFOR

CROSS-REFERENCE TO RELATED APPLICATION

This application relates to and claims priority from Japanese Patent Application No. 2005-127871, filed on Apr. 26, 2005, the entire disclosure of which is incorporated herein by reference.

BACKGROUND OF THE INVENTION

1. Field of the Invention

The present invention relates to a storage system and a control method therefor. More particularly, this invention can be preferably applied to a storage system configured in such a manner that a disk drive and a disk controller are connected to each other via cables.

2. Description of the Related Art

Conventionally, a storage system is composed of: a disk controller that interfaces with a host system; and a disk drive that accommodates a plurality of storage devices managed according to RAID (Redundant Arrays of Inexpensive Disks) system. The disk controller and the disk drive are connected to each other via serial interface cables for sending and receiving data.

With this type of storage system, information: about a failure occurring at the disk controller or the disk drive is reported to users by notifying a management terminal of the disk controller and an external management terminal composed of, for example, a personal computer connected to the above-mentioned management terminal, and displaying the details of the failure on the displays of the management terminal and the external management terminal.

In order to notify the disk controller of a disk drive failure in the above-described case, the following two methods have been suggested and put into practical use: a first method of embedding time-shared failure information in a data link layer and notifying the disk controller of the embedded failure information via a serial interface (hereinafter referred to as the "first failure notification method); and a second method of providing a failure notification interface, in addition to a data communication interface, at the disk controller and the disk drive respectively, and notifying the disk controller of any failure occurring at the disk drive (hereinafter referred to as the "second failure notification method").

Japanese Patent Laid-Open (Kokai) Publication No. HEI 5-30073 discloses an invention concerning a method for notifying a host system of a power failure occurring at a back-end system, or notifying the back-end system of a power failure occurring at the host system.

SUMMARY OF THE INVENTION

In the storage system, the disk controller and the disk drive have their own respective power supply units. The disk controller and the disk drive use their power supply units to convert a commercial alternating current, which they respectively have captured externally, into a direct current, and supply the direct current to various kinds of circuits and respective hard disk drives (HDDs) within the disk controller and the disk drive.

When the first failure notification method is adopted for notifying the disk controller of a failure occurring at the disk drive, and if the failure occurs in the power supply unit, there is a problem in that no power is supplied to the circuit that controls the data link and, therefore, it is impossible to notify the disk controller of the power failure.

As one method for solving the above-mentioned problem, Japanese Patent Laid-Open (Kokai) Publication No. HEI 5-30073 discloses a method of providing, on a digital demultiplexer, a new emergency power supply unit for power failure in addition to the normally-used power supply unit. However, this method has a problem in that the entire system configuration becomes larger and more complicated because it is necessary to provide an additional emergency power supply unit.

When the second failure notification method is adopted—providing the failure notification interface, besides the data communication interface, on the disk controller and the disk drive respectively—it results in an increase in the number of interfaces, thereby causing a problem in that the entire system configuration becomes larger and more complicated.

The present invention was devised considering the above-described problems and is intended to propose a storage system that can practically and sufficiently cope with power failures at the disk drive without the need for complication and upsizing of the entire system configuration.

In order to solve the above-described problems, this invention provides a storage system that includes: a drive for driving a storage device to store data; and a controller for controlling input and output of the data between a host system and the drive, wherein the drive and the controller are connected to each other via a cable. The controller includes: a first power supply unit for outputting an emergency power supply voltage when a power failure occurs at the drive; a first multiplexing unit for multiplexing the emergency power supply voltage outputted from the first power supply unit, with a first signal to be sent to the drive and sending the resultant emergency power supply voltage via the cable to the drive; and a failure processing unit for executing specified processing in response to power failure information sent from the drive via the cable. When a power failure occurs at the drive, the drive is powered with the emergency power supply voltage sent from the controller; and the drive includes a failure detecting unit for outputting the power failure information, and a second multiplexing unit for multiplexing the power failure information output from the failure detecting unit with a second signal to be sent to the controller and sending the resultant power failure information via the cable to the controller.

This invention also provides a method for controlling a storage system that includes a drive for driving a storage device to store data, and a controller for controlling input and output of the data between a host system and the drive, wherein the drive and the controller are connected to each other via a cable. The storage system controlling method includes: a first step performed at the controller of multiplexing an emergency power supply voltage for a power failure at the drive, with a first signal to be sent to the drive and sending the resultant emergency power supply voltage via the cable to the drive; a second step performed at the drive when a power failure occurs at the drive, of powering the drive with the emergency power supply voltage sent from the controller, multiplexing specified power failure information with a second signal to be sent to the controller, and sending the resultant power failure information via the cable to the controller; and a third step performed at the controller of executing specified processing in response to the power failure information sent from the drive via the cable.

This invention can realize a storage system that can definitely cause the drive to notify the controller of a power failure occurring at the drive without providing any failure notification interface, besides the data communication interface on either the controller or the drive, and can practically and sufficiently cope with the power failure at the drive without the need for complication and upsizing of the entire system configuration.

DETAILED DESCRIPTION OF THE INVENTION

Embodiments of this invention are described below in detail with reference to the attached drawings.

(1) EMBODIMENT 1

(1-1) Configuration of Storage System According to Embodiment 1

Figure 1:
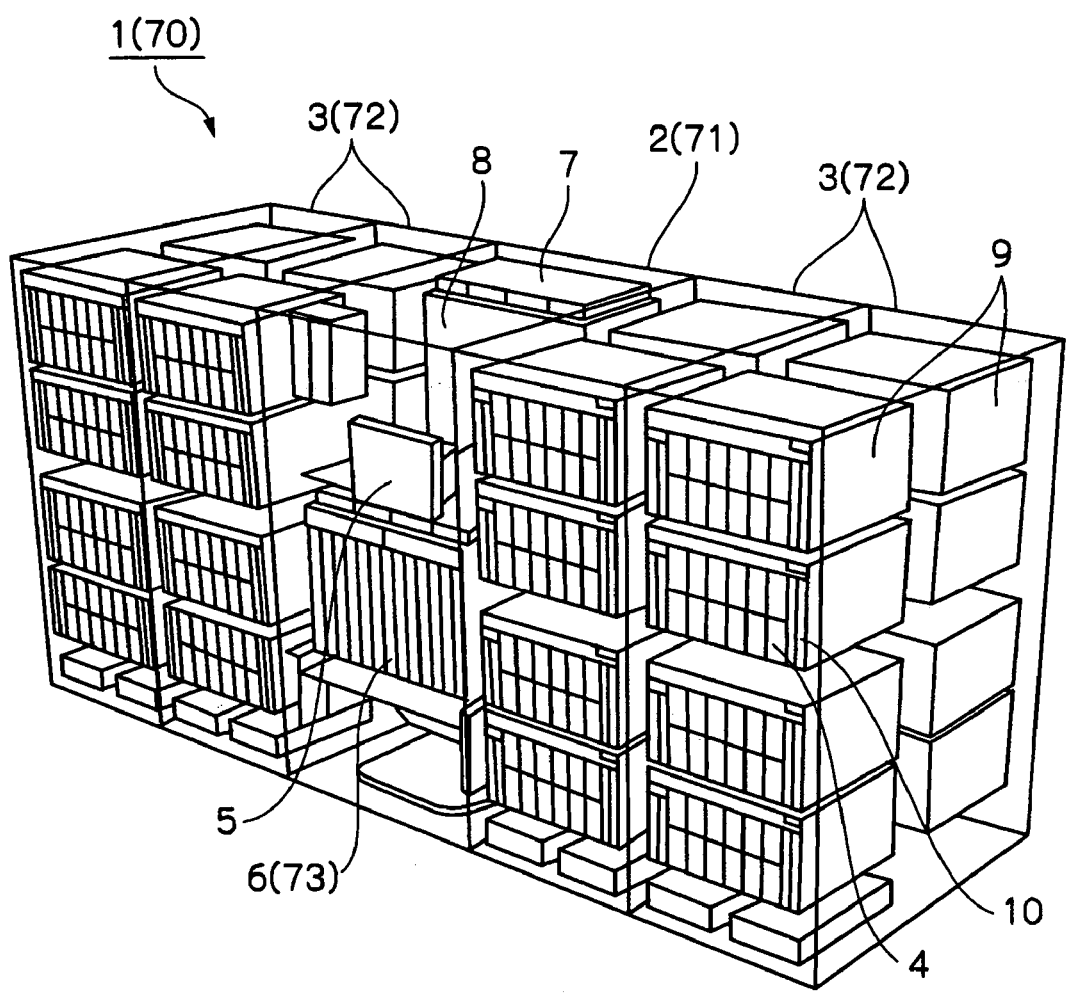
FIG. 1 is a perspective view of the exterior structure of a storage system according to Embodiment 1 of this invention.

FIG. 1 shows the exterior configuration of a storage system 1 according to Embodiment 1. This storage system 1 has a disk controller 2 and disk drives 3.

The disk controller 2 controls the entire storage system 1 including data input/output control between a host system and the disk drives 3, and is composed of, for example, a management terminal 5, a control unit 6, cooling fans 7, and a power supply unit 8. The management terminal 5 is a personal computer for users to maintain and manage the storage system 1 and is equipped with, for example, a display and a keyboard. The control unit 6 controls the entire storage system 1. The cooling fans 7 are used to cool down the power supply unit 8. The power supply unit 8 supplies necessary driving power to, for example, the management terminal 5, the control unit 6, and the cooling fans 7 respectively.

Each disk drive 3 accommodates many disk units 4. The disk drive 3 drives the disk units 4 under the control of the disk controller 2. The disk units 4 are stored in disk containers 9 placed in a housing of the disk drive 3 in such a manner that the disk units 4 can be removed from the disk containers 9 whenever necessary. The disk containers 9 can be placed not only on the front side of the disk drives 3 where the management terminal 5 is stored, but also on the other side.

Figure 2:
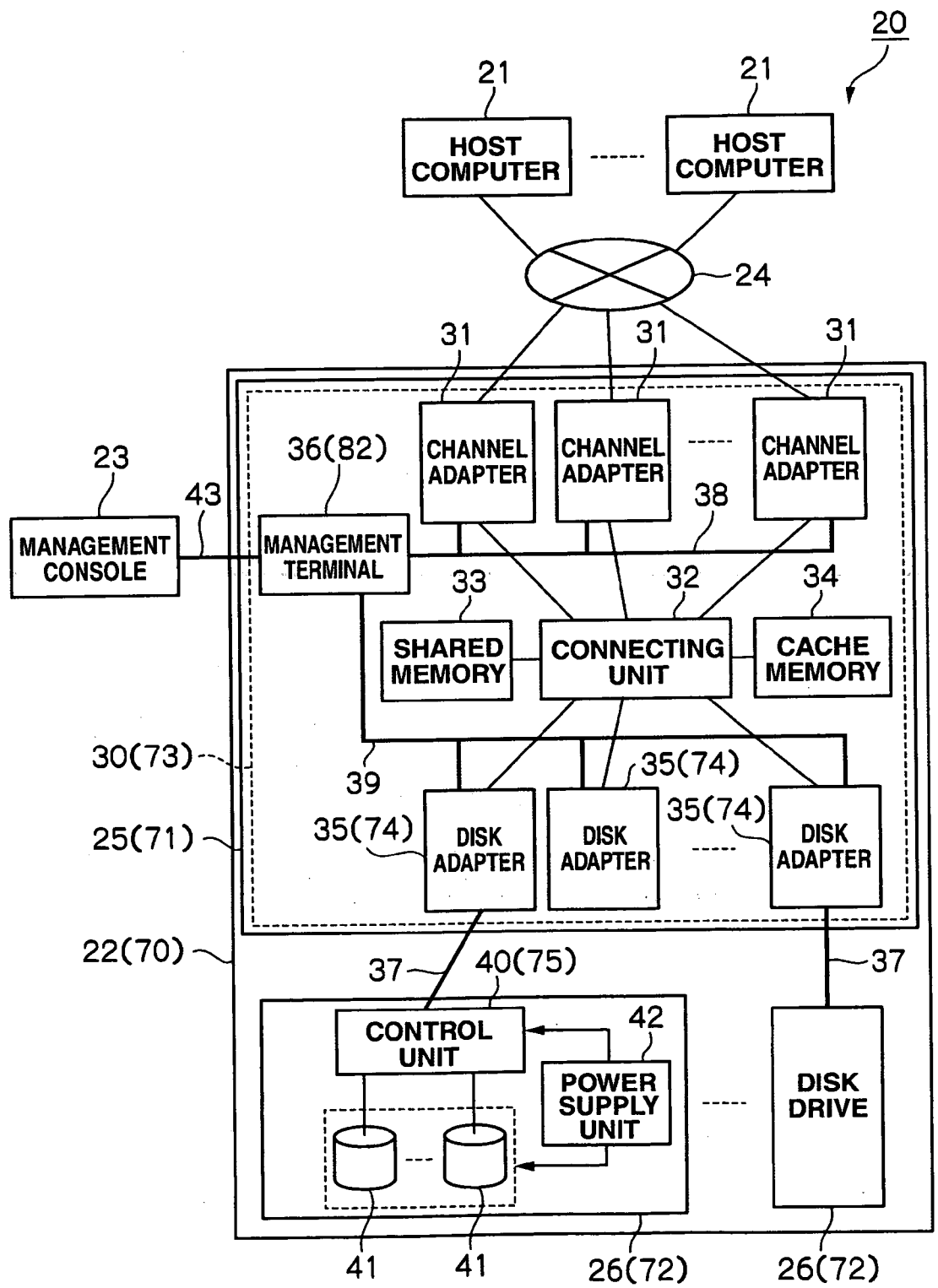
FIG. 2 is a block diagram of the configuration of a network system according to Embodiment 1.

The disk controller 2 is connected to the respective disk drives 3 via Fiber Channel cables 37 described later in detail (FIG. 2). Various commands and data to read from and write to disk devices in the disk units 4 are transmitted between the disk controller 2 and the disk drives 3 via the Fiber Channel cables 37.

FIG. 2 shows a network system 20 that employs a storage system 22 configured in the same manner as that of the storage system 1. This network system 20 is composed of a plurality of host computers 21, the storage system 22, and a management console 23.

Each host computer 21 as a host system is a computer system equipped with information processing resources such as a CPU (Central Processing Unit) and memory. Specifically speaking, the host computer 21 is, for example, a personal computer, a workstation, or a mainframe. The host computer 21 includes: information input devices (not shown in the drawing) such as a keyboard, a switch, a pointing device, and/or a microphone; and information output devices (not shown in the drawing) such as a monitor display and/or speakers.

The host computers 21 are connected via a network 24 composed of, for example, a SAN, a LAN, the Internet, public line(s), or private line(s), to the storage system 22. Communications between the host computers 21 and the storage system 22 via the network 24 are conducted, for example, according to Fiber Channel Protocol (FCP) when the network 24 is a SAN, or according to Transmission Control Protocol/Internet Protocol (TCP/IP) when the network 24 is a LAN.

The storage system 22 is composed of a disk controller 25 and a plurality of disk drives 26 as described above. A control unit 30 of the disk controller 25 is composed of a plurality of channel adapters 31, a connecting unit 32, a shared memory 33, a cache memory 34, a plurality of disk adapters 35, a management terminal 36, and a power supply unit (not shown in the drawing).

Each channel adapter 31 is configured as a microcomputer system equipped with, for example, a microprocessor, memory, and a communication interface, and each channel adapter 31 has a port for connection to the network 24. The channel adapters 31 interpret and execute various kinds of commands sent from the host computers 21 via the network 24. The respective ports on the channel adapters 31 are given network addresses such as an Internet Protocol (IP) address or a World Wide Name (WWN) to identify themselves on the network 24. Accordingly, each channel adapter 31 can individually act as a NAS (Network Attached Storage).

The connecting unit 32 is connected to the channel adapters 31, the shared memory 33, the cache memory 34, and the disk adapters 35. Data and commands are sent and received via the connecting unit 32 between the channel adapters 31, the shared memory 33, the cache memory 34, and the disk adapters 35. The connecting unit 32 is composed of a switch or a bus such as a very high speed crossbar switch that transmits data via a high speed switching action.

The shared memory 33 and the cache memory 34 are memories shared by the channel adapters 31 and the disk adapters 35. The shared memory 33 is used mainly to store control information and commands, while the cache memory 34 is used mainly to temporarily store data to input to or output from the disk drive 26.

Each disk adapter 35 is configured as a microcomputer system equipped with a microprocessor and memory, and functions as an interface to conduct protocol control during communication with the disk drive 26. The disk adapters 35 are connected via the Fiber Channel cables to each disk drive 26 and thereby send and receive data to and from the disk drive 26 according to Fiber Channel Protocol.

The management terminal 36 controls the entire operation of the storage system 22 and is connected via a LAN to the respective channel adapters 31 and via a LAN 39 to the respective disk adapters 35. The management terminal 36 executes, for example, the following processing: monitoring whether any failure has occurred in the storage system 22; notifying the management console 23 of the occurrence of the failure and having the management console 23 display the failure; and instructing a control unit to lock-out a disk unit 41 in accordance with an instruction from the management console 23 in response to an operator's instruction.

Each disk drive 26 is composed of a control unit 40, a plurality of disk units 41, and a power supply unit 42. The control unit 40 is configured as a microcomputer system equipped with a microprocessor, memory, and a communication interface with the disk controller 25. The control unit 40 controls data input to and output from the respective disk units 41 in response to data input/output requests given from the host computer 21 via the disk controller 25.

Each disk unit 41 is configured by containing, for example, expensive disk devices such as SCSI (Small Computer System Interface) disks, or inexpensive disk devices such as SATA (Serial AT Attachment) disks or optical disks. The disk devices in each disk unit 41 are operated by the control unit 40 according to a RAID system. One or more logical volumes (hereinafter referred to as the "logical volumes") are set on physical storage areas provided by one or more disk devices. These logical volumes store data.

The management console 23 is composed of a computer such as a personal computer, a workstation, or a portable information terminal, and is connected via a LAN 43 to the management terminal 36 of the disk controller 25. This management console 23 includes: display units to display a GUI (Graphical User Interface) for performing various kinds of settings for the storage system 22, and other various information; input devices, such as a keyboard and a mouse, for an operator to input various kinds of operations and settings; and communication devices to communicate with the management terminal 36 of the disk controller 25 via the LAN 43. The management console 23 performs various kinds of processing based on various kinds of commands entered via the input devices. For example, the management console 23 makes the display units display various kinds of information, such as failure information, notified by the management terminal 36 of the disk controller 25, and sends the details of various settings entered via the GUI displayed on the display units to the management terminal 36 of the disk controller 25.

The flow of data input/output to or from the storage system 22 in the network system 20 is described below. When a command to write data to a specified logical volume in the storage system 22 is entered by a user, in response to the command the host computer 21 sends a data write request and the write data to one of the channel adapters 31 in the disk controller 5 of the storage system 22.

The channel adapter 31, having received the data write request, writes the write command to the shared memory 33 and the write data to the cache memory 34. Now, the disk adapter 35 is always monitoring the shared memory 33, and once the disk adapter 35 detects that the write command has been written to the shared memory 33, it converts the data write request by logical address designation into a data write request by physical address designation and sends the resultant data write request via the Fiber Channel cable 37 to the disk drive 26. Moreover, the disk adapter 35 reads out the write data from the cache memory 34 in accordance with the write command written to the shared memory 33 and sends it via the Fiber Channel cable 37 to the disk drive 26.

When receiving the data write request from the disk controller 25, the control unit 40 of the disk drive 26 controls the corresponding disk unit 41 according to the data write request and thereby has the disk unit 41 write the write data at the designated address position of the relevant disk device in the disk unit 41.

In contrast, when a command to read data stored in a specified logical volume in the storage system 22 is entered by a user, the host computer 21 sends the corresponding data read request to one of the channel adapters 31 in the disk controller 25 of the storage system 22.

The channel adapter 31, having received this data read request, writes the read command to the shared memory 33. Upon detecting that the read command has been written to the shared memory 33, the disk adapter 35 converts the data read request by logical address designation into a data read request by physical address designation and sends the resultant data read request via the Fiber Channel cable 37 to the disk drive 26.

Upon receiving the data read request from the disk controller 25, the control unit 40 of the disk drive 26 controls the corresponding disk unit 41 according to the data read request and thereby makes the disk unit 41 read the read data from the designated address position of the relevant disk device in the disk unit 41. The control unit 40 sends this read-out data (hereinafter referred to as the "read-out data") via the Fiber Channel cable 37 to the corresponding disk adapter 35 of the disk controller 25.

The disk adapter 35, having received the read-out data, writes the read command to the shared memory 33 and also writes the read-out data to the cache memory 34. Now, the channel adapter 31 is always monitoring the shared memory 33, and once the channel adapter 31 detects that the read command has been written to the shared memory 33, it reads out the read-out data from the cache memory 34 according to the read command and sends the obtained read-out data to the corresponding host computer 21 via the network 24.

In addition to the above-described configuration, the storage system 22 has continuous supply of an emergency power supply voltage from the disk controller 25 to each disk drive 26; and the storage system 22 has a power failure reporting function to, when a power failure occurs at the disk drive 26, power the control unit 40 of the disk drive 26, using the power supply voltage from the disk controller 25, and to notify the disk controller 25 of the occurrence of the power failure at the disk drive 26.

Figure 3:
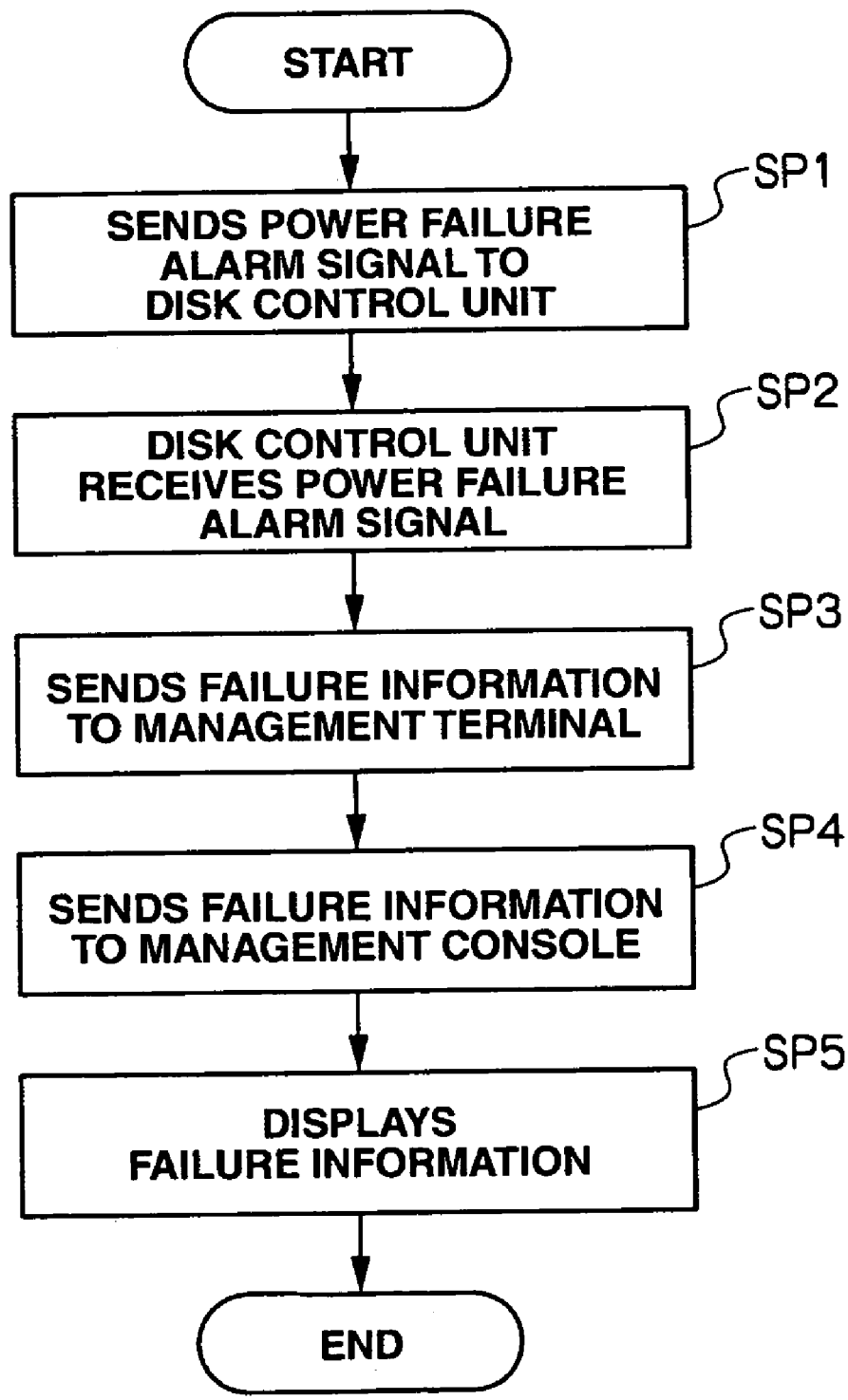
FIG. 3 is a flowchart of processing executed by the storage system when a power failure occurs.

FIG. 3 is a flowchart of processing executed by the storage system 22 regarding the power failure reporting function. The control unit 40 of the disk drive 26 is always monitoring the state of the power supply unit 42; and when detecting a power failure, the control unit 40 multiplexes the data with a specified power failure alarm signal and sends the resultant power failure alarm signal to the disk controller 25 (SP1).

When the disk adapter 35 of the disk controller 25 receives the power failure alarm signal (SP2), it notifies the management terminal 36 of the damaged segment (the power supply unit 42 of the corresponding disk drive 26) and the failure content (the power failure) as failure information (SP3). Receiving this notice from the disk adapter 35, the management terminal 36 sends a corresponding notice to the management console 23 (SP4). As a result, the display unit of the management console 23 displays the occurrence of the power failure at the relevant disk drive 26 (SP5).

Using the management console 23 in the above-described manner, the storage system 1 notifies an operator of the occurrence of the power failure at the disk drive 26.

(1-2) Detailed Configuration of the Storage System

Figure 4:
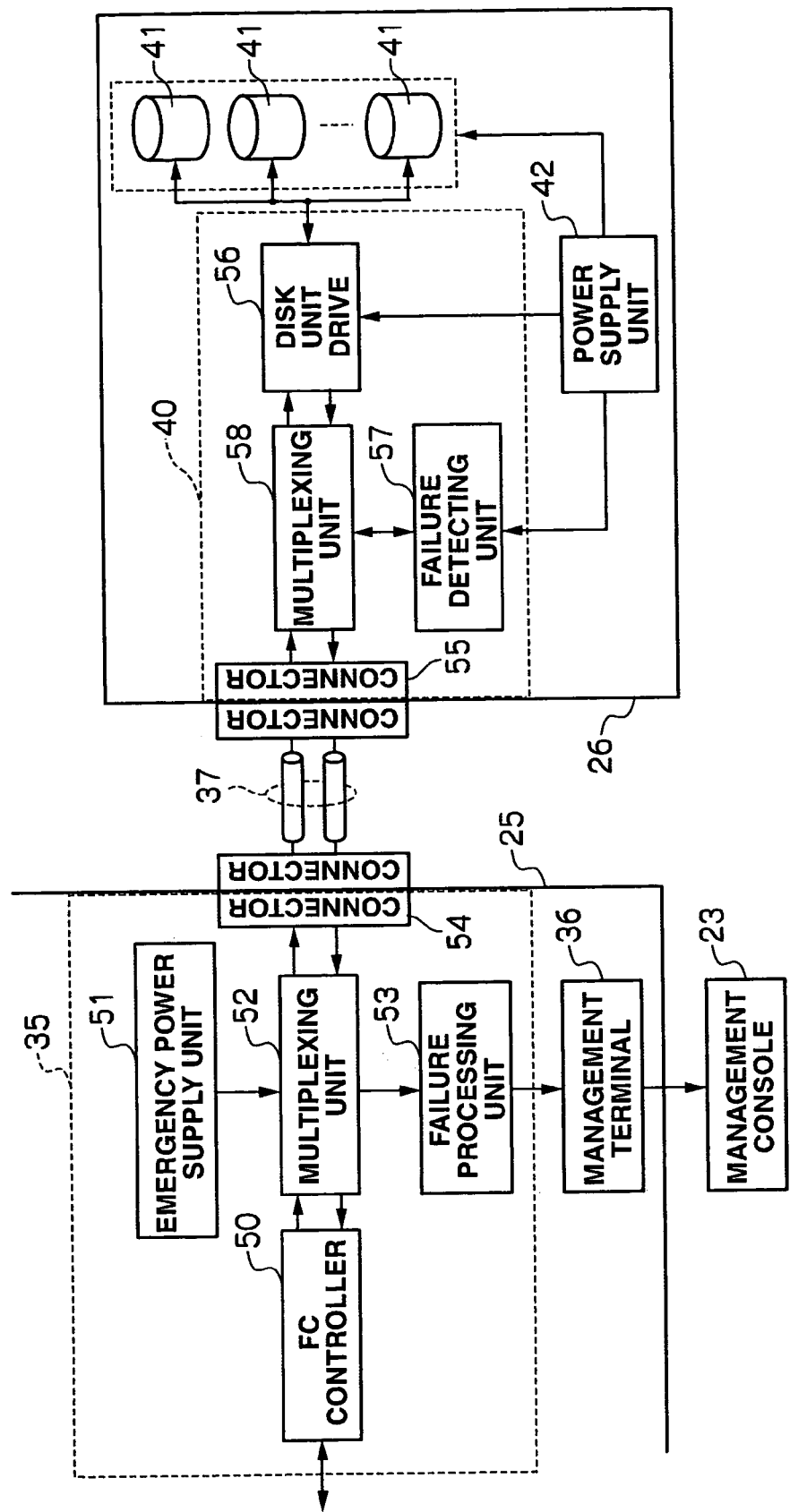
FIG. 4 is a block diagram illustrating the configuration of a disk adapter for a disk controller and a disk drive.

FIG. 4 shows the configuration of each disk adapter 35 of the disk controller 25 and the control unit 40 of each disk drive 26 in the storage system 22 for the power failure reporting function.

As shown in FIG. 4, each disk adapter 35 of the disk controller 25 includes: a Fiber Channel controller 50 as a communication interface with the disk drive 26; an emergency power supply unit 51 for outputting power to be supplied to the control unit 40 of the disk drive 26 when a power failure occurs at the disk drive 26; a multiplexing unit 52 for multiplexing the respective outputs from the Fiber Channel controller 50 and the emergency power supply unit 51; a failure processing unit 53 for detecting a power failure alarm signal sent from the disk drive 26 during a power failure and executing necessary processing; and a connector 54 based on Fiber Channel standards.

The disk drive 26 includes: a connector 55 based on Fiber Channel standards; a failure detecting unit 57 for outputting the corresponding power failure alarm signal when detecting the power failure; a disk unit drive 56 for controlling the corresponding disk unit 41 in response to a read request or a write request from the disk controller 25; and a multiplexing unit 58 for multiplexing the respective outputs from the disk unit drive 56 and the failure detecting unit 57.

The Fiber Channel controller 50 of the disk controller 25 converts a data input/output request by file designation given from the host computer 21 (FIG. 2) via the channel adapter 31 (FIG. 2) into a data read request or a data write request by block designation and sends the resultant data read/write request to the multiplexing unit 52 according to Fiber Channel Protocol. When the data input/output request from the host computer 21 is a write request, the Fiber Channel controller 50 sends the write data that it has received with the data input/output request, to the multiplexing unit 52 according to the Fiber Channel Protocol.

Figure 5:
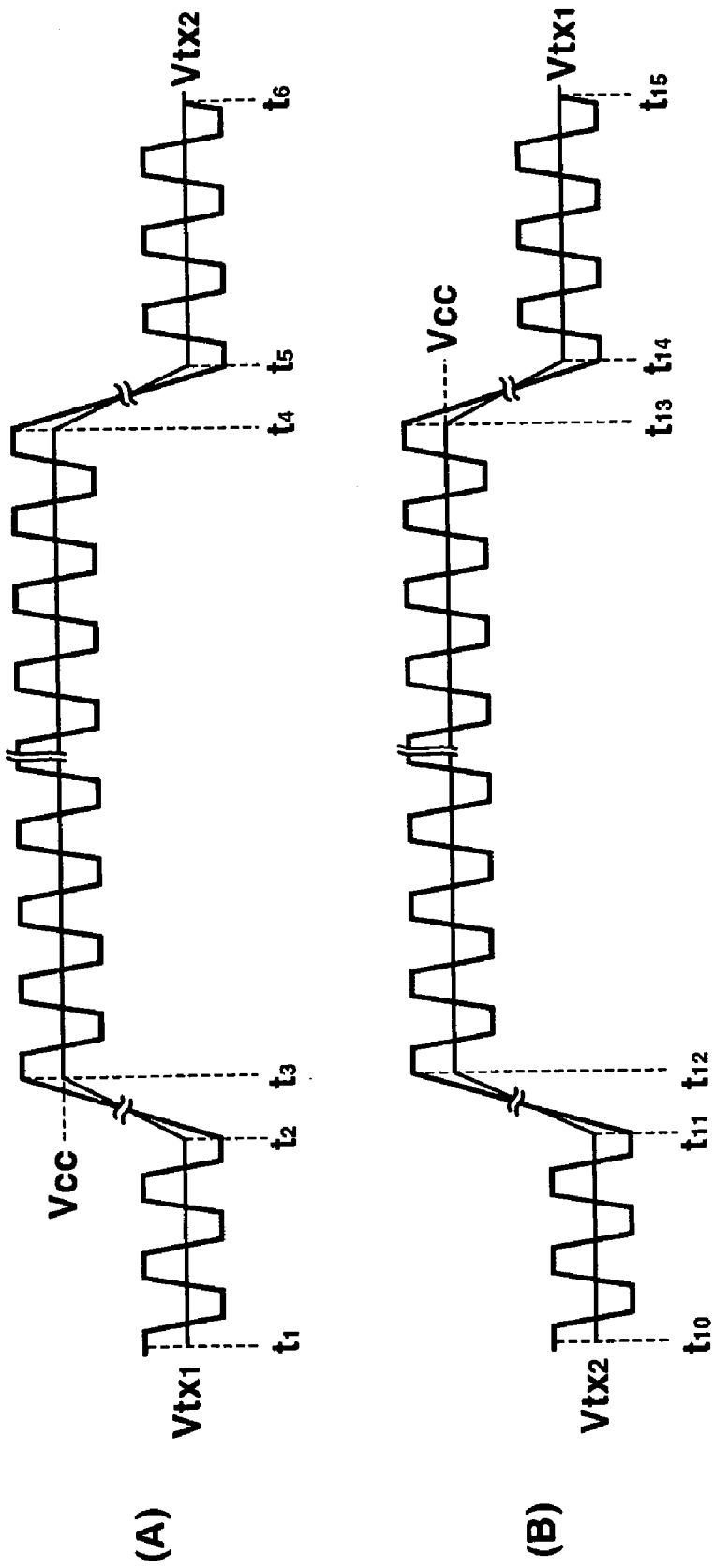
FIG. 5(A) is a waveform chart that indicates respective waveforms of signals used in the storage system.
FIG. 5(B) is a waveform chart that indicates respective waveforms of signals used in the storage system.

The emergency power supply unit 51 always outputs a constant power supply voltage to the multiplexing unit 52. The multiplexing unit 52 multiplexes: a signal as shown from time $t_1$ to time $t_2$ in FIG. 5(A) that is composed of a data read request, a data write request, and write data and sent from the Fiber Channel controller 50; and the power supply voltage of a constant value as supplied from the emergency power supply unit 51. The multiplexing unit 52 sends the multiplexed signal thus obtained as shown from time $t_3$ to time $t_4$ in FIG. 5(A), to the disk drive 26 via the connector 54 and the Fiber Channel cable 37 connected to the connector 54.

The disk drive 26 inputs the multiplexed signal via the connector 55 to the multiplexing unit 58. The multiplexing unit 58 separates and extracts the data component made of, for example, the data read request, the data write request, and the write data as shown from time $t_5$ to time $t_6$ in FIG. 5(A), and then sends the data component to the disk unit drive 56.

The disk unit drive 56 sends the data component of the supplied multiplexed signal, that is, the data read request, the data write request, and the write data, to the corresponding disk unit 41. The relevant data thus designated is then read out from the designated address position or the write data is stored at the designated address position. If the disk unit drive 56 reads out the data from the disk unit 41, it sends the data as a read data signal to the multiplexing unit 58 according to Fiber Channel Protocol.

The failure detecting unit 57 is always monitoring the power supply voltage given from the power supply unit 42, and sends a power failure alarm signal to the multiplexing unit 58 when the power supply voltage becomes less than or equal to a predetermined threshold value (that is, when a power failure occurs). Receiving the power failure alarm signal, the multiplexing unit 58 multiplexes the power failure alarm signal with a read data signal that is supplied from the disk unit drive 56 and is composed of, for example, the data read from the corresponding disk unit 41 as shown from time $t_{10}$ to time $t_{11}$ in FIG. 5(B); and the multiplexing unit 58 then sends the multiplexed signal thus obtained as shown from time $t_{12}$ to time $t_{13}$ in FIG. 5(B), via the connector 55 to the disk controller 25.

The disk controller 25 inputs the multiplexed signal, which is sent from the disk drive 26, to the multiplexing unit 52 via the connector 54. The multiplexing unit 52 separates and extracts the read data signal as shown from time $t_{14}$ to time $t_{15}$ in FIG. 5(B) from the supplied multiplexed signal, and sends the obtained read data signal to the Fiber Channel controller 50. Consequently, the Fiber Channel controller 50 sends the data, which is read from the disk unit 41 of the disk drive 26 and is contained in the read data signal, via the connecting unit 32 (FIG. 2) to the cache memory 34 and has the cache memory 34 store the data as described above, while it stores the read command in the shared memory 33.

The multiplexing unit 52 outputs the multiplexed signal received from the disk drive 26, to the failure processing unit 53. The failure processing unit 53 is always monitoring the multiplexed signal; and once it detects that the multiplexed signal is multiplexed with the power failure alarm signal, it sends a corresponding power failure detection signal to the management terminal 36.

When a power failure occurs at the disk drive 26, this may have some effect on the disk unit 41 and, therefore, data input to or output from the disk unit 41 may not be conducted accurately. Accordingly, when the management terminal 36 receives the power failure alarm signal, it controls the corresponding channel adapter 31 (FIG. 2) to stop the transmission of the data read from the disk unit 41 of the disk drive 26 to the corresponding host computer 21 (FIG. 2), and makes the host computer 21 send an error signal. Moreover, the management terminal 36 controls the disk adapter 35 to stop the read-out of the data from the disk drive 26 where the power failure has occurred.

Furthermore, the management terminal 36 notifies the management console 23 of the failure information, including the damaged segment and the failure content, based on the power failure alarm signal. Consequently, the management console 23 displays the occurrence of the power failure at the disk drive 26, based on the above notice.

Figure 6:
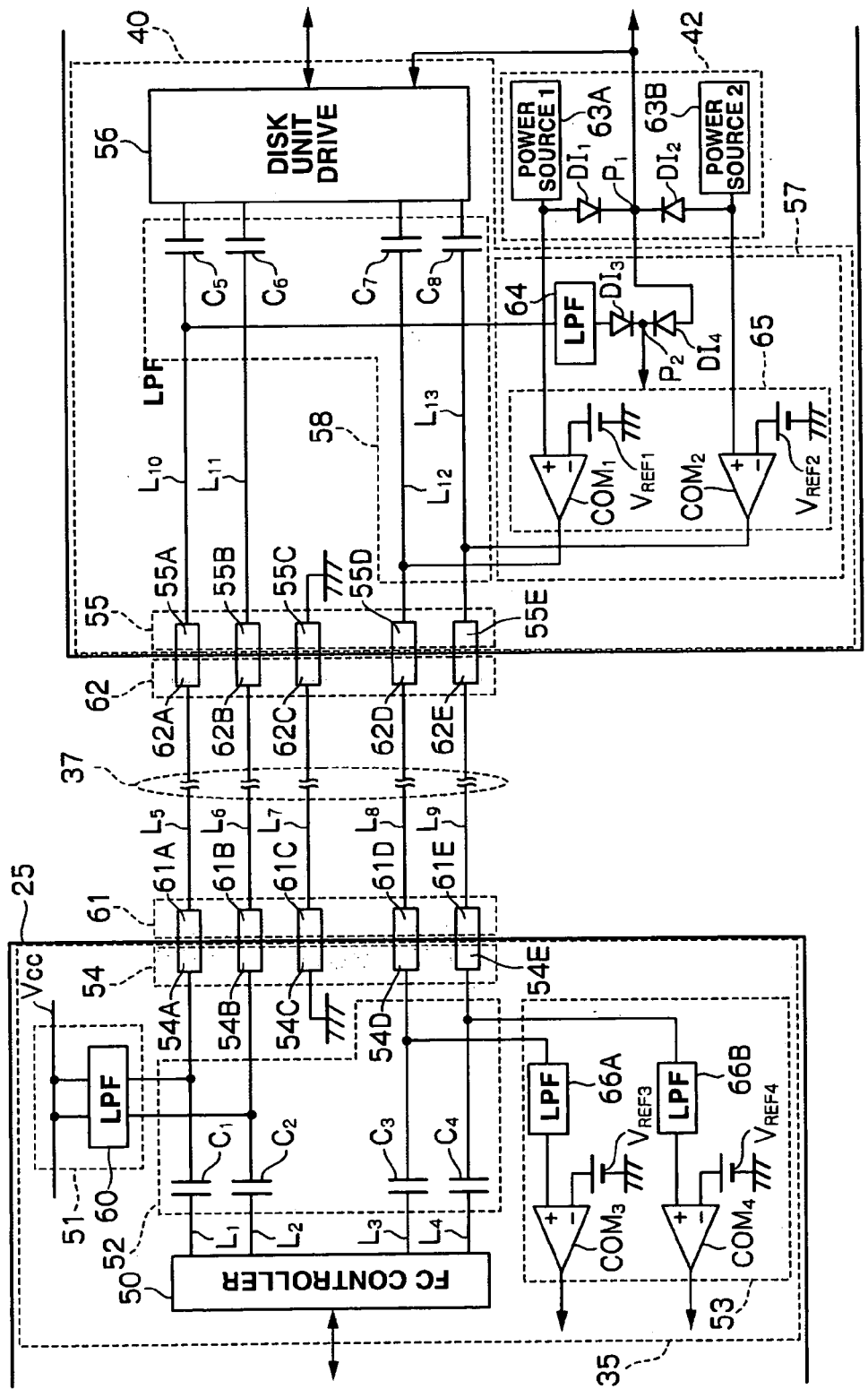
FIG. 6 is a circuit diagram illustrating the detailed configuration of the disk adapter for the disk controller and the disk drive in the storage system.

FIG. 6 shows the specific configuration of the disk adapter 35 of the disk controller 25, and the control unit 40 and the power supply unit 42 of the disk drive 26 described above regarding FIG. 4. As is clear from FIG. 6, two signal lines as downward transmission lines (hereinafter referred to as the "first and second downward signal lines") $L_1$ and $L_2$, and two signal lines as upward transmission lines (hereinafter referred to as the first and second upward signal lines") $L_3$ and $L_4$ extend from the Fiber Channel controller 50 of the disk controller 26 according to Fiber Channel standards, and these respective signal lines are connected to their corresponding electrodes 54A to 54E of the connector 54. The Fiber Channel controller 50 outputs signals to be sent to the disk drive 26 to the first and second downward signal lines $L_1$ and $L_2$.

The emergency power supply unit 51 of the disk controller 25 is composed of a power supply line $V_{cc}$ and a low-pass filter 60 connected thereto. Two output terminals of the low-pass filter 60 are connected respectively to the two different signal lines, that is, the first and second downward signal lines $L_1$ and $L_2$. Accordingly, the emergency power supply unit 51 can use the low-pass filter 60 to prevent the signal, which is transmitted through the first and second downward signal lines $L_1$ and $L_2$, from being mixed into the power supply line $V_{cc}$, and can also apply the emergency power supply voltage $V_{cc}$ for the controller 40 of the disk drive 26, to the first and second signal lines $L_1$ and $L_2$.

The multiplexing unit 52 of the disk drive 26 has coupling capacitors $C_1$ to $C_4$ as filters inserted into the first and second downward signal lines $L_1$ and $L_2$ and the first and second upward signal lines $L_3$ and $L_4$. Because of the existence of the coupling capacitors $C_1$ to $C_4$, the multiplexing unit 52 can prevent the power supply voltage, which is supplied from the emergency power supply unit 51 to the first and second downward signal lines $L_1$ and $L_2$, and the power failure alarm signal, which is supplied from the failure detecting unit 57 of the disk drive 26 to the first and second upward signal lines $L_1$ and $L_2$ as described later, from entering the Fiber Channel controller 50 and can also separate and extract only the signal (such as the read-out data) from the disk drive 26 and supply it to the Fiber Channel controller 50.

The connector 54 of the disk controller 26 has a total of five electrodes 54A to 54E, two downward electrodes, two upward electrodes, and one ground electrode. Among these electrodes, the two downward electrodes 54A and 54B are respectively connected to the first and second downward signal lines $L_1$ and $L_2$, and the two upward electrodes 54D and 54E are respectively connected to the first and second upward signal lines $L_3$ and $L_4$. The ground electrode 54C is grounded.

The Fiber Channel cable 37 has a total of five signal lines $L_5$ to $L_9$: two downward signal lines $L_5$ and $L_6$, two upward signal lines $L_8$ and $L_9$, and one ground signal line $L_7$. These signal lines $L_5$ to $L_9$ are respectively connected to their corresponding electrodes 61A to 61E and 62A to 62E of connectors 61 and 62 placed at both ends of the Fiber Channel cable 37.

Like the connector 54 of the disk controller 25, the connector 55 of the disk drive 26 has a total of five electrodes 55A to 55E, two downward electrodes, two upward electrodes, and one ground electrode. Among these electrodes, the two downward electrodes 55A and 55B are respectively connected to the first and second downward signal lines $L_{10}$ and $L_{11}$ that extend from the disk unit drive 56, and the two upward electrodes 55D and 55E are respectively connected to the first and second upward signal lines $L_{12}$ and $L_{13}$ that extend from the disk unit drive 56. The ground electrode 55C is grounded.

The multiplexing unit 58 of the disk drive 26 has coupling capacitors $C_5$ to $C_8$ as filters inserted into the first and second downward signal lines $L_{10}$ and $L_{11}$ and the first and second upward signal lines $L_{12}$ and $L_{13}$. Because of the existence of the coupling capacitors $C_5$ to $C_8$, the multiplexing unit 58 can prevent the power supply voltage, which is supplied from the emergency power supply unit 51 of the disk controller 25 via the Fiber Channel cable 37 to the first and second downward signal lines $L_{10}$ and $L_{11}$, and the power failure alarm signal, which is supplied from the failure detecting unit 57 to the first and second upward signal lines $L_{12}$ and $L_{13}$ as described later, from entering the disk unit drive 56 and can also separate and extract only the signal (such as the write data) from the disk controller 25 out of the multiplexed signal and supply the obtained signal to the disk unit drive 56.

The power supply unit 42 of the disk drive 26 is composed of: a first power source 63A and a second power source 63B that are respectively composed of AC-DC converters for converting an alternating current from commercial alternating current power sources into a direct current; and first and second reverse-current preventing diodes $DI_1$, and $DI_2$, each having the same on-resistance. In this case, the cathode of the first reverse-current preventing diode $DI_1$ is connected to the first power source 63A, and the cathode of the second reverse-current preventing diode $DI_2$ is connected to the second power source 63B. The anode of the first reverse-current preventing diode $DI_1$ is connected to the anode of the second reverse-current preventing diode $DI_2$. Accordingly, the power supply unit 42 is configured in such a way that either one of power supply voltages respectively output from the first and second power sources 63A and 63B can be output, via a connection midpoint $P_1$ between the anodes of the first and second reverse-current preventing diodes $DI_1$ and $DI_2$, to the failure detecting unit 57.

The failure detecting unit 57 is composed of first and second diodes $DI_3$ and $DI_4$, each having the same on-resistance, a low-pass filter 64, and a comparing unit 65. The low-pass filter 64 separates and extracts the power supply voltage supplied from the disk controller 51, out of the multiplexed signal running through the first downward signal line $L_{10}$. The cathode of the first diode $DI_3$ is connected, via the low-pass filter 64, to a point along the first downward signal line $L_{10}$ between the connector 55 and the coupling capacitor $C_5$ of the multiplexing unit 58. The cathode of the second diode $DI_4$ is connected to a connection midpoint t $P_2$ between the first and second diodes $DI_1$ and $DI_2$ of the power supply unit 42. Moreover, the anode of the first diode $DI_3$ is connected to the anode of the second diode $DI_4$. Accordingly, the failure detecting unit 57 is configured in such a way that: when the power supply unit 42 supplies the power supply voltage, the power is supplied to the comparing unit 65; and when a failure occurs at the power supply unit 42 and the supply of the power supply voltage is stopped, the power supply voltage supplied from the emergency power supply unit of the disk controller 25 to the first downward signal line $L_{10}$ can be supplied to the comparing unit 65.

The comparing unit 65 has first and second comparators $COM_1$ and $COM_2$, each having the same configuration. The output terminal of the first comparator $COM_1$ is connected to a point along the first upward signal line $L_{12}$ between the connector 55 and the coupling capacitor $C_7$ of the multiplexing unit 58. The positive input terminal of the first comparator $COM_1$ is connected to the first power source 63A of the power supply unit 42, and a reference voltage $V_{REF1}$ that is set to a specified value lower than the output voltage from the first power source 63A of the power supply unit 42 is normally applied to the negative input terminal of the first comparator $COM_1$. Accordingly, the failure detecting unit 57 is configured in such a way that when a failure occurs at the first power source 63A of the power supply unit 42 and the voltage applied by the first power source 63A to the positive input terminal of the first comparator $COM_1$ of the comparing unit 65 becomes lower than the reference voltage $V_{REF1}$, the failure detecting unit 57 can react to that voltage change and then apply a constant voltage as a power failure alarm signal to the first upward signal line $L_{12}$ connected to the output terminal of the first comparator $COM_1$.

Likewise, the output terminal of the second comparator $COM_2$ of the comparing unit 65 is connected to a point along the second upward signal line $L_{13}$ between the connector 55 and the coupling capacitor $C_8$ of the multiplexing unit 58, and the positive input terminal of the second comparator $COM_2$ is connected to the second power source 63B of the power supply unit 42. Moreover, a reference voltage $V_{REF2}$ that is set to a specified value lower than the output voltage from the second power source 63B of the power supply unit 42 is normally applied to the negative input terminal of the second comparator $COM_2$. Accordingly, the failure detecting unit 57 is configured in such a way that when a failure occurs at the second power source 63B of the power supply unit 42 and the voltage applied by the second power source 63B to the positive input terminal of the second comparator $COM_2$ becomes lower than the reference voltage $V_{REF2}$, the failure detecting unit 57 can react to that voltage change and then apply a constant voltage as the power failure alarm signal to the second upward signal line $L_{13}$ connected to the output terminal of the second comparator $COM_2$.

On the other hand, the failure processing unit 53 of the disk controller 25 has first and second comparators $COM_3$ and $COM_4$. The positive input terminal of the first comparator $COM_3$ is connected, via the low-pass filter 66A, to a point along the first upward signal line $L_3$ between the connector 54 and the coupling capacitor $C_3$ of the multiplexing unit 52. Therefore, the failure processing unit 53 is configured in such a way that it can separate and extract only the power failure alarm signal out of the multiplexed signal running along the first upward signal line $L_3$ and feed the power failure alarm signal to the positive input terminal of the first comparator $COM_3$.

The negative input terminal of the first comparator $COM_3$ receives a reference voltage $V_{REF3}$ that is much lower than the voltage of the first upward signal line $L_3$ when the failure detecting unit 57 of the disk drive 26 applies the power failure alarm signal. Accordingly, the failure processing unit 53 is configured in such a way that when a failure occurs at the first power source 63A of the power supply unit 42 in the disk drive 26 and, as a result, the power failure alarm signal is supplied from the disk drive 26 to the first upward signal line $L_3$, the failure processing unit 53 can react to that supply of the power failure alarm signal and send a failure detection signal of a constant voltage from the output terminal of the first comparator $COM_3$ to the management terminal 36.

Likewise, the positive input terminal of the second comparator $COM_4$ is connected, via the low-pass filter 66B, to a point along the second upward signal line $L_4$ between the connector 54 and the coupling capacitor $C_4$ of the multiplexing unit 52. Therefore, the failure processing unit 53 is configured in such a way that it can separate and extract only the power failure alarm signal out of the multiplexed signal running along the second upward signal line $L_4$ and feed the power failure alarm signal to the positive input terminal of the second comparator $COM_4$.

The negative input terminal of the second comparator $COM_4$ receives a reference voltage $V_{REF4}$ that is much lower than the voltage of the second upward signal line $L_4$ when the failure detecting unit 57 of the disk drive 26 applies the power failure alarm signal. Accordingly, the failure processing unit 53 is configured in such a way that when a failure occurs at the second power source 63B of the power supply unit 42 in the disk drive 26 and, as a result, the power failure alarm signal is supplied from the disk drive 26 to the second upward signal line $L_4$, the failure processing unit 53 can react to that supply of the power failure alarm signal and send a failure detection signal of a constant voltage from the output terminal of the second comparator $COM_4$ to the management terminal 36.

With the storage system 1 according to Embodiment 1 as described above, the disk controller 25 always supplies the power supply voltage to each disk drive 26; and if a power failure occurs at any disk drive 26, the control unit 40 of the disk drive 26 is powered with the power supply voltage from the disk controller 25 and notifies the disk controller 25 of the occurrence of the power failure at the disk drive 26. Therefore, even if a power failure occurs at the disk drive 26, the disk controller 25 can be notified of that occurrence with certainty.

In such cases, the storage system 1 utilizes the Fiber Channel cable 37 used for normal data transfer when the disk controller 25 supplies the power supply voltage to each disk drive 26 and when the disk drive 26 notifies the disk controller 25 of the power failure. Accordingly, no increase in the number of interfaces is required.

Therefore, the storage system 1 can notify the disk controller 25 of a failure occurring at the disk drive 26 without the need for complication and upsizing of the entire system configuration.

(2) EMBODIMENT 2

Referring to FIGS. 1 and 2, reference numeral 70 indicates a storage system according to Embodiment 2. This storage system 70 has a similar configuration to that of the storage system 22 according to Embodiment 1 (FIG. 2), except that a disk drive 72 has a failure reporting function to notify a disk controller 71 of the occurrence of failures, in addition to the power failure at the disk drive 72, such as a malfunction of one of the cooling fans (not shown in the drawings) in the disk drive 72 driven by power supplied from a separate power supply system other than a control unit 75 of the disk drive 72, or an abnormal temperature increase within the disk drive 72.

Figure 7:
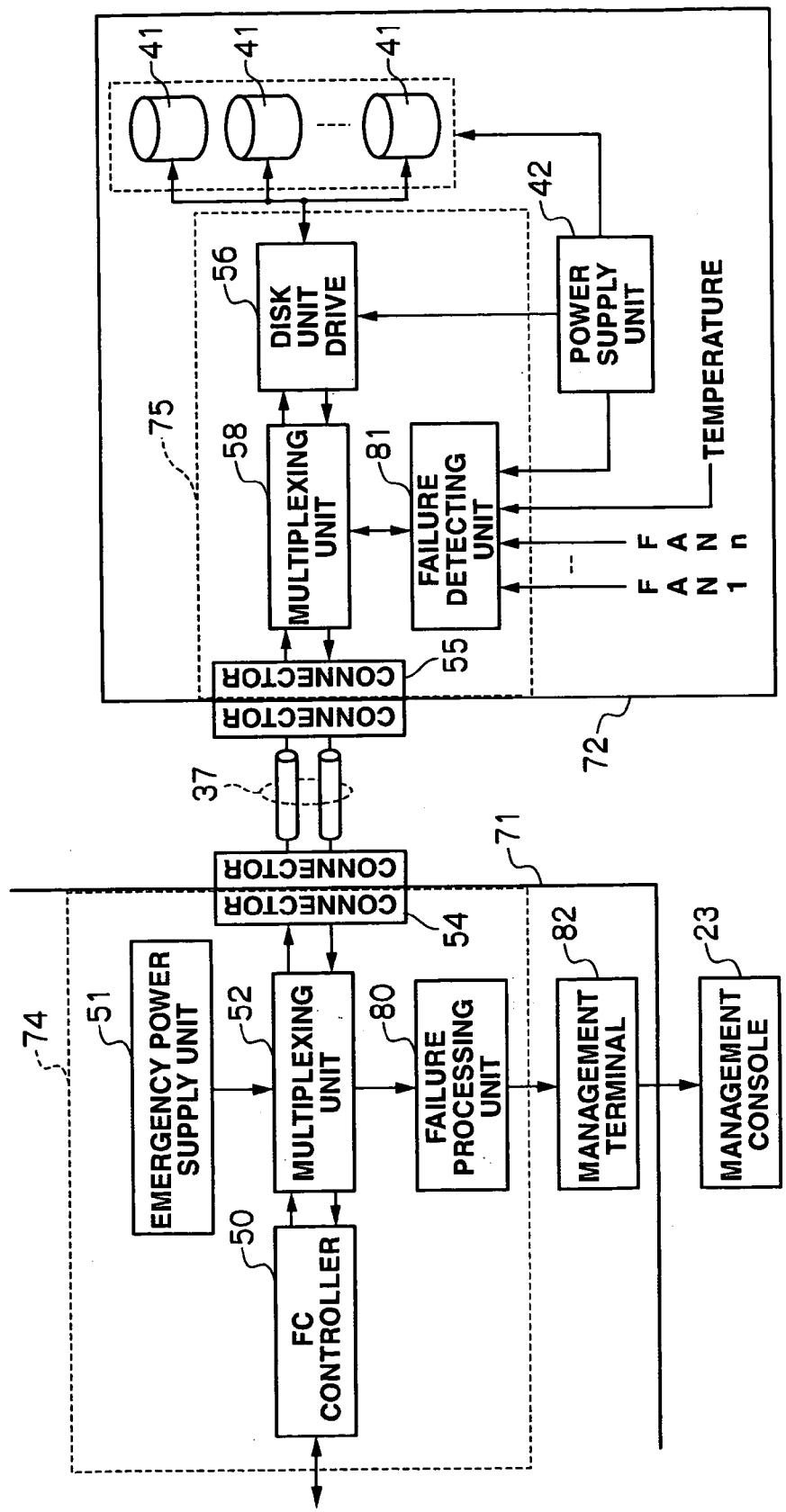
FIG. 7 is a block diagram illustrating the configuration of a disk adapter for a disk controller and a disk drive in a storage system according to Embodiment 2.
Figure 8:
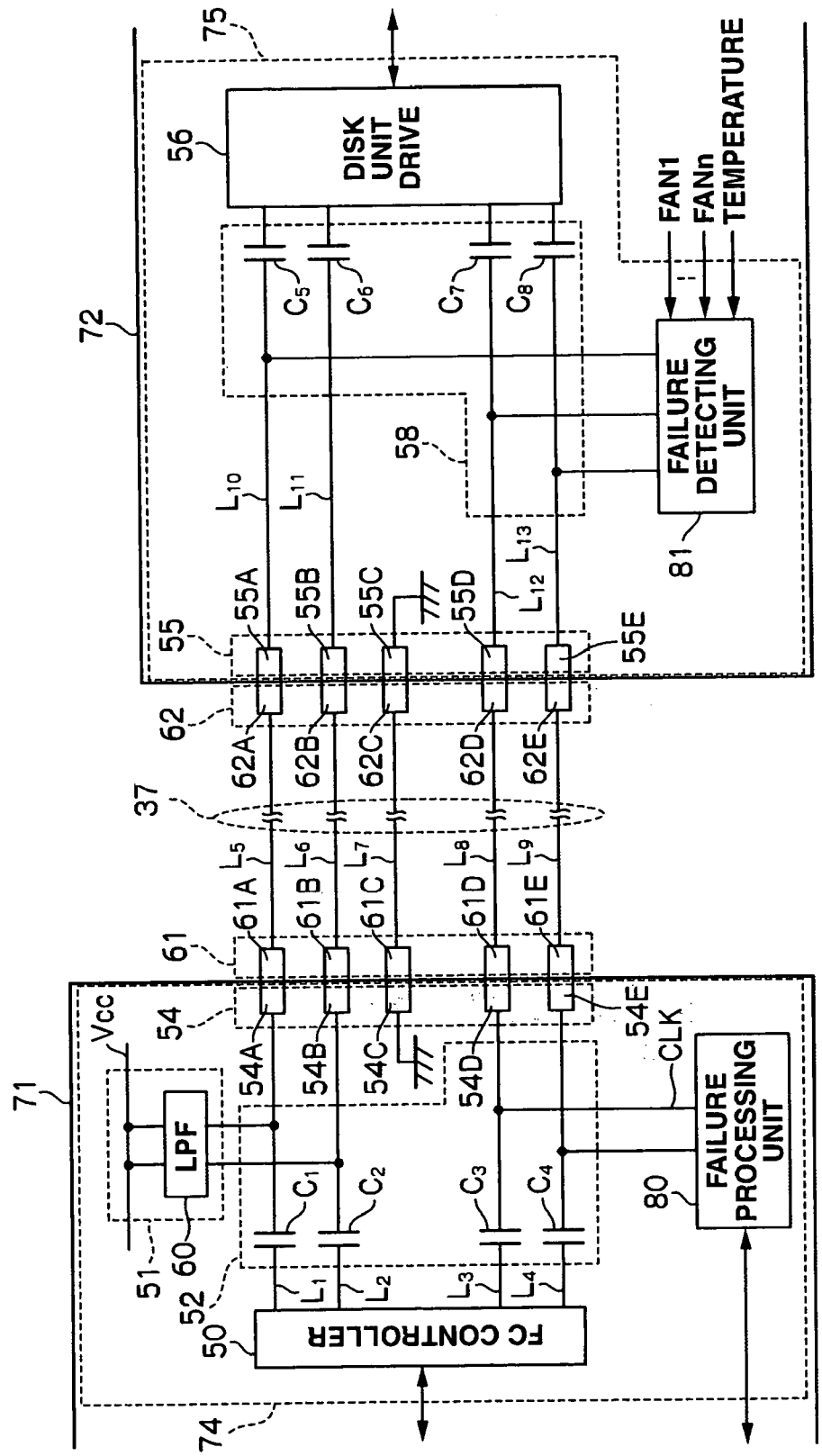
FIG. 8 is a block diagram illustrating the configuration of the disk adapter for the disk controller and the disk drive in the storage system according to Embodiment 2.

FIG. 7 and FIG. 8, which have the same reference numerals to indicate the parts corresponding to those in FIG. 4 and FIG. 6 respectively, show the configuration of each disk adapter 74 of the disk controller 71 and the control unit 75 of each disk drive 72 in the storage system 70. As is clear from FIGS. 7 and 8, the disk adapter 74 of the disk controller 71 has a similar configuration to that of the disk adapter 35 according to Embodiment 1 (FIGS. 4 and 6) except for the configuration of a failure processing unit 80, and the control unit 75 of the disk drive 72 has a similar configuration to that of the control unit 40 according to Embodiment 1 (FIGS. 4 and 6) except for the configuration of a failure detecting unit 81.

Figure 9:
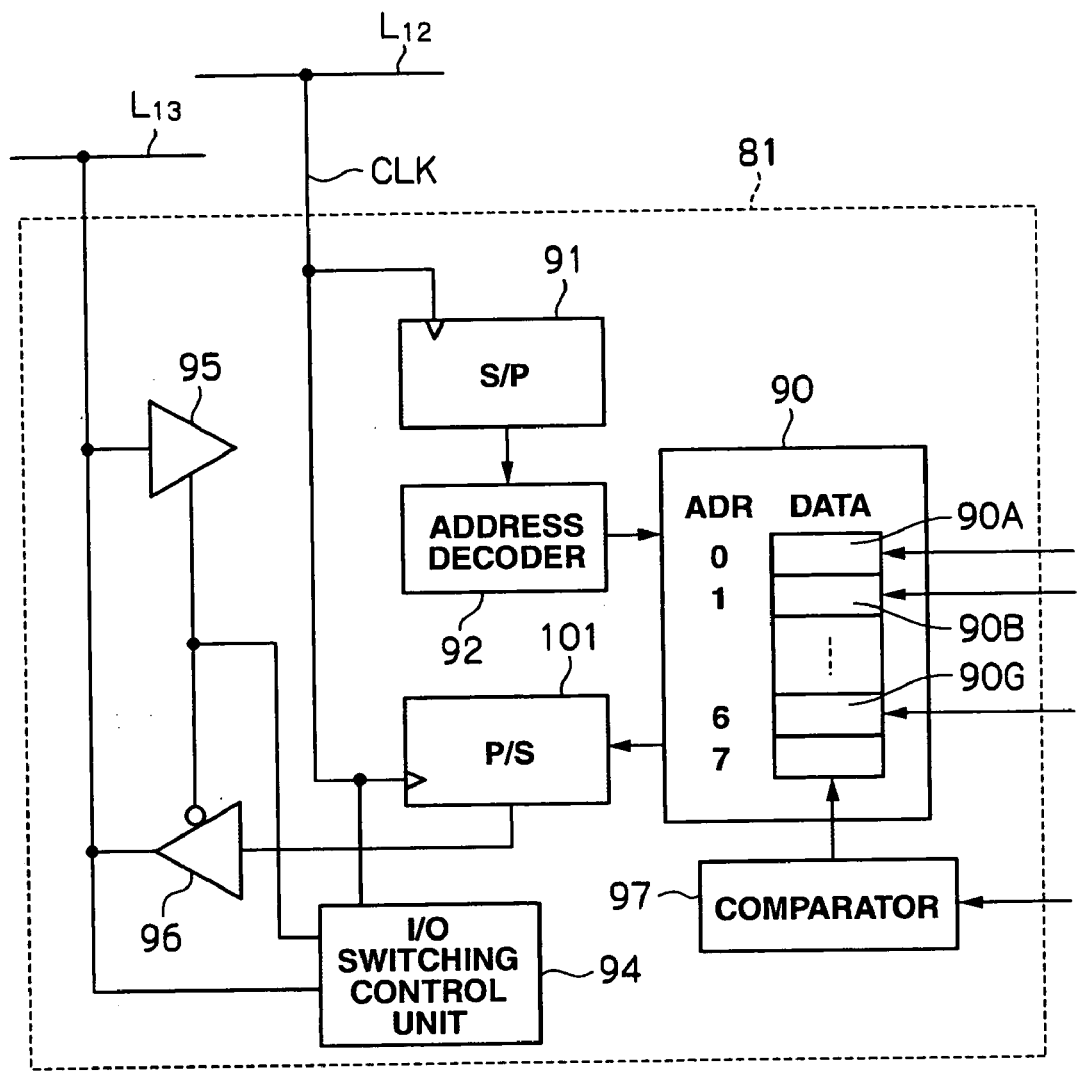
FIG. 9 is a block diagram illustrating the configuration of a failure detecting unit according to Embodiment 2.

As shown in FIG. 9, the failure detecting unit 81 of the control unit 75 of the disk drive 72 is composed of: a failure information storing resistor 90, a serial-parallel converter 91, an address decoder 92, a parallel-serial converter 93, an I/O switching control unit 94, first and second buffers 95 and 96, and a comparator 97.

The current number of rotations of cooling fans as detected by sensors provided on the respective cooling fans in the disk drive 72, and the temperature inside the disk drive 72 as detected by a temperature sensor provided on the disk drive 72 are given to the failure information storing register 90 and are stored as failure information in specified storage areas 90A to 90G. The failure information storing resistor 90 also has a one-bit storage area 90H for power failure. When the comparator 97 with a similar configuration to that of the comparing unit 65 described above regarding FIG. 6 detects a power failure, the storage area 90H stores a flag as the failure information.

Figure 10:
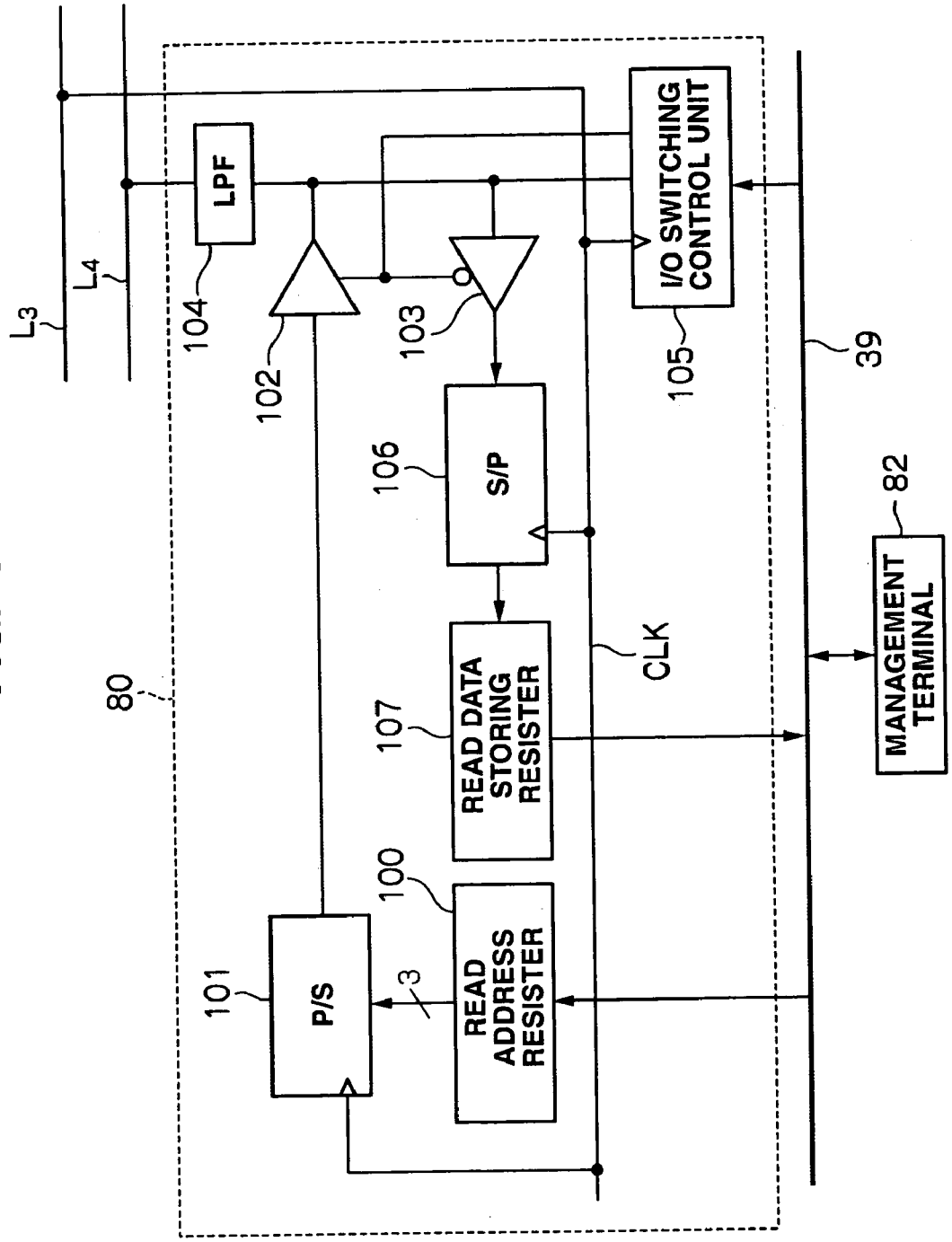
FIG. 10 is a block diagram illustrating the configuration of a failure processing unit according to Embodiment 2.

On the other hand, as shown in FIG. 10, the failure processing unit 80 of the disk controller 71 is composed of: a read address register 100, a parallel-serial converter 101, first and second buffers 102 and 103, a low-pass filter 104, an I/O switching control unit 105, a serial-parallel converter 106, and a read data storing register 107. The parallel-serial converter 101, the I/O switching control unit 105, and the serial-parallel converter 106 receive a clock signal CLK of a specified frequency from a transmitter (not shown in the drawing).

This clock signal CLK is also applied to the first upward signal line $L_3$ and is sent via this first upward signal line $L_3$ and the Fiber Channel cable 37 to the disk drive 72. In such cases, the frequency of the clock signal CLK is selected to be about several kilohertz to several tens of kilohertz, while the frequency of the read-out data to be sent from the disk drive 72 to the disk controller 71 is in the gigahertz bandwidth. Accordingly, this clock signal CLK or various kinds of data described below to be exchanged between the disk controller 71 and the disk drive 72 in synchronization with the clock signal CLK will neither be transmitted via the capacitor $C_3$ or $C_4$ (FIG. 8) of the multiplexing unit 58 of the disk controller 71 to the Fiber Channel controller 50 (FIG. 8), nor be transmitted via the capacitor $C_7$ or $C_8$ (FIG. 8) of the multiplexing unit 58 of the disk drive 72 to the disk unit drive 56 (FIG. 8).

When a management terminal 82 (FIG. 7) is required to detect, for example, the operating state of the cooling fans in the disk drive 72, the temperature within the disk drive 72, or whether or not a power failure has occurred at the disk drive 72, the read address register 100 stores the address of the relevant storage area 90A to 90H, where the failure information to be acquired from the failure information storing register 90 of the failure detecting unit 91 described above with reference to FIG. 9 is stored. In the following description, the number of the storage areas 90A to 90H in the failure information storing register 90 is eight, and the address assigned to each of the storage areas 90A to 90H is represented by 3 bits.

Figure 11:
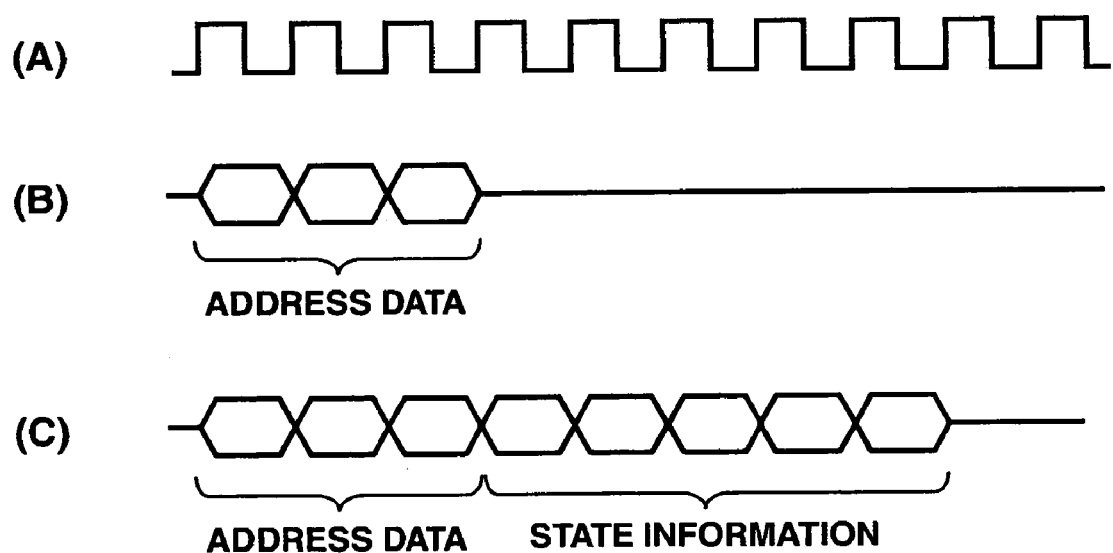
FIG. 11(A) is a conceptual diagram for explanation of a clock signal.
FIG. 11(B) is a conceptual diagram for explanation of address data.
FIG. 11(C) is a conceptual diagram for explanation of failure information.

The parallel-serial converter 101 reads out the address stored in the read address register 100, executes parallel-serial conversion of the address in synchronization with the clock signal CLK as shown in FIG. 11(A), and sends the serial 3-bit address data thus obtained as shown in FIG. 11(B) to the first buffer 102. At this moment, the I/O switching control unit 105 activates only the first buffer 102 of the first and second buffers 102 and 103 under the control of the management terminal 82. Consequently, the address data is applied via the first buffer 102 and the low-pass filter 104 to the second upward signal line $L_4$, and is then sent via the Fiber Channel cable 37 (FIG. 8) to the disk drive 72.

As shown in FIG. 9, the disk drive 72 inputs the address data from the disk controller 71 to the first buffer 95 and the I/O switching control unit 94, while it inputs the clock signal CLK from the disk controller 71 to each of the serial-parallel converter 91, the parallel-serial converter 93, and the I/O switching control unit 94.

When the I/O switching control unit 94 receives the address data from the disk controller 71, it activates only the first buffer 95 of the first and second buffers 95 and 96. Accordingly, the address data is sent via the first buffer 95 to the parallel-serial converter 91.

The serial-parallel converter 91 executes serial-parallel conversion of the supplied address data and then sends the obtained parallel address data to the address decoder 92. The address decoder 92 causes the failure information storing register 90 to read out the failure information stored in the relevant storage area 90A to 90H at the corresponding address. Consequently, the failure information storing register 90 adds the address of its relevant storage area 90A to 90H, where the failure information is stored, to the top of the read failure information and then sends the resultant failure information to the parallel-serial converter 93.

The parallel-serial converter 93 executes parallel-serial conversion of the supplied failure information and then sends the obtained failure information data as shown in FIG. 11(C) to the second buffer 96. At this moment, the I/O switching control unit 94 activates only the second buffer 96 of the first and second buffers 95 and 96 after receiving the address data from the disk controller 71. Accordingly, the failure information data output from the parallel-serial converter 93 is supplied via the second buffer 96 to the second upward signal line $L_{13}$. Consequently, the failure information is multiplexed with the read-out data output from the disk unit drive 56 of the disk drive 71, and is then sent via the second upward signal line $L_{13}$ and the Fiber Channel cable 37 to the disk controller 71.

The failure information received by the disk controller 71 is separated and extracted from the read-out data by the low-pass filter of the failure processing unit 80, and then supplied to the second buffer 103 and the I/O switching control unit 105 of the failure processing unit 80. The I/O switching control unit 105 of the disk controller 71 is always monitoring the receipt of the failure information data from the disk drive 71. Once the I/O switching control unit 105 receives the failure information, it activates only the second buffer 103 of the first and second buffers 102 and 103 and thereby supplies the failure information to the serial-parallel converter 106.

The serial-parallel converter 106 executes serial-parallel conversion of the supplied failure information data and then stores the obtained parallel failure information data in the read register 107. The parallel failure information data stored in the read register 107 is later read out by the management terminal 82 and then reported to and displayed on the management console 23.

With the storage system 70 as described above, not only the power failure of the disk drive 72, but also other failure information is multiplexed with the read-out data and then sent via the Fiber Channel cable 37 to the disk controller 71. Therefore, even if a power failure occurs at the power supply system that supplies power to the control unit 75 of the disk drive 72, an operator can easily confirm not only the fact that the power failure did occur, but also the operating state of each cooling fan driven by the power supplied by another power supply system, and the temperature within the disk drive 72.

(3) OTHER EMBODIMENTS

In the above explanations, Embodiments 1 and 2 describe the case where the present invention is applied to a storage system 22 or 70 having a disk controller 25 or 71 and a disk drive 26 or 72 connected to each other via Fiber Channel cables 37. However, this invention is not limited to the above-described configuration, but can be widely applied to storage systems having their disk controllers and disk drives connected to each other via cables in conformity with protocols other than Fiber Channel Protocol.

Moreover, Embodiments 1 and 2 describe the case where the failure processing unit 53 or 80 of the disk controller 25 or 71, and the failure detecting unit 57 or 81 of the disk drive 26 or 72 are configured as illustrated in FIG. 6, FIG. 9, or FIG. 10. However, this invention is not limited to the above-described configurations, but a wide variety of other configurations can be applied as the failure processing unit and failure detecting unit configurations.

Furthermore, Embodiment 2 describes the case where the operating state of the cooling fans and the temperature of the disk drive 72 are applied as failure information, other than the power failure, to be reported by the disk drive 72 to the disk controller 70. However, this invention is not limited to the application of such information alone, but failure information other than that described above may be reported by the disk drive 72 to the disk controller 70. The present invention can be widely applied to storage systems of various forms configured in such a manner that their drives for driving the storage devices to store data, and their controllers for controlling data input and output between the host systems and the drives are connected to each other via cables.

What is claimed is:

1. A storage system comprising:
   a drive for driving a storage device to store data; and
   a controller for controlling input and output of the data between a host system and the drive,
   the drive and the controller being connected to each other via a cable;
   wherein the controller includes:
      a first power supply unit for outputting an emergency power supply voltage when a power failure occurs at the drive;
      a first multiplexing unit for multiplexing the emergency power supply voltage output from the first power supply unit, with a first signal to be sent to the drive and sending the resultant emergency power supply voltage via the cable to the drive; and
      a failure processing unit for executing specified processing in response to power failure information sent from the drive via the cable; and
   wherein when a power failure occurs at the drive, the drive is powered with the emergency power supply voltage sent from the controller; the drive including:
      a failure detecting unit for outputting the power failure information; and
      a second multiplexing unit for multiplexing the power failure information output from the failure detecting unit with a second signal to be sent to the controller and sending the resultant power failure information via the cable to the controller.

2. The storage system according to claim 1, wherein the cable includes:
   a first transmission line for sending the first signal from the controller to the drive; and
   a second transmission line for sending the second signal from the drive to the controller; and
   wherein the first multiplexing unit sends the first signal and the emergency power supply voltage, which are multiplexed, via the first transmission line to the drive; and
   the second multiplexing unit sends the second signal and the power failure information, which are multiplexed, via the second transmission line to the controller.

3. The storage system according to claim 1, wherein the first multiplexing unit includes a first filter for separating and extracting the second signal from a multiplexed signal produced by multiplexing the second signal and the power failure information.

4. The storage system according to claim 1, wherein the second multiplexing unit includes a second filter for separating and extracting the first signal from a multiplexed signal produced by multiplexing the first signal and the emergency power supply voltage.

5. The storage system according to claim 1, wherein the failure processing unit includes a third filter for separating and extracting the power failure information from a multiplexed signal produced by multiplexing the second signal and the power failure information.

6. The storage system according to claim 1, wherein the failure detecting unit includes a fourth filter for separating and extracting the emergency power supply voltage from a multiplexed signal produced by multiplexing the first signal and the emergency power supply voltage.

7. The storage system according to claim 1, wherein the controller sends a clock signal of a specified frequency, which is different from the frequencies of the first signal and the second signal, via the cable to the drive, and
   the drive sends the power failure information via the cable to the controller in synchronization with the clock signal.

8. The storage system according to claim 7, wherein the drive includes a register for storing a number of kinds of failure information, including the power failure information, at respective different addresses;
   the controller sends the address of the register where the failure information to be acquired is stored, via the cable to the drive in synchronization with the clock signal; and
   the drive reads, from the register, the failure information stored at the corresponding address of the register and sends the read failure information via the cable to the controller in synchronization with the clock signal.

9. The storage system according to claim 1, wherein the first signal is a signal that contains a data read request and is sent from the controller to the drive, and
   the second signal is a signal that contains the data read from the storage device in response to the read request and is sent from the drive to the controller.

10. A method for controlling a storage system including a drive for driving a storage device to store data, and a controller for controlling input and output of the data between a host system and the drive, the drive and the controller being connected to each other via a cable;
   wherein the storage system controlling method comprises:
   a first step performed at the controller of multiplexing an emergency power supply voltage for a power failure at the drive, with a first signal to be sent to the drive and sending the resultant emergency power supply voltage via the cable to the drive;

a second step performed at the drive when a power failure occurs at the drive, of powering the drive with the emergency power supply voltage sent from the controller, multiplexing specified power failure information with a second signal to be sent to the controller, and sending the resultant power failure information via the cable to the controller; and a third step performed at the controller of executing specified processing in response to the power failure information sent from the drive via the cable.

11. The storage system controlling method according to claim 10, wherein the cable includes:

a first transmission line for sending the first signal from the controller to the drive; and a second transmission line for sending the second signal from the drive to the controller; and wherein in the first step the first signal and the emergency power supply voltage, which are multiplexed, are sent via the first transmission line to the drive; and in the second step the second signal and the power failure information, which are multiplexed, are sent via the second transmission line to the controller.

12. The storage system controlling method according to claim 10, wherein in the second step the controller sends a clock signal of a specified frequency, which is different from frequencies of the first signal and the second signal, via the cable to the drive, and the drive sends the power failure information via the cable to the controller in synchronization with the clock signal.

13. The storage system controlling method according to claim 12, wherein the drive includes a register for storing a number of kinds of failure information, including the power failure information, at respective different addresses; and in the second step the controller sends the address of the register where the failure information to be acquired is stored, via the cable to the drive in synchronization with the clock signal; and the drive reads, from the register, the failure information stored at the corresponding register address and sends the read failure information via the cable to the controller in synchronization with the clock signal.

14. The storage system controlling method according to claim 10, wherein the first signal is a signal that contains a data read request and is sent from the controller to the drive, and the second signal is a signal that contains the data read from the storage device in response to the read request and is sent from the drive to the controller.

* * * * *